United States Patent
Kaufhold et al.

(10) Patent No.: US 6,559,266 B2
(45) Date of Patent: *May 6, 2003

(54) ALIPHATIC THERMOPLASTIC POLYURETHANES, A PROCESS FOR PRODUCING THEM AND THE USE THEREOF

(75) Inventors: Wolfgang Kaufhold, Cologne (DE); Wolfgang Braeuer, Leverkusen (DE); Hans-Georg Wussow, Duesseldorf (DE); Hans-Georg Hoppe, Leichlingen (DE); Steven C. Manning, Wheeling, WV (US)

(73) Assignees: Bayer Corporation, Pittsburgh, PA (US); Bayer Aktiengesellschaft, Leverkusen (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 33 days.

(21) Appl. No.: 09/447,025

(22) Filed: Nov. 22, 1999

(65) Prior Publication Data

US 2001/0053841 A1 Dec. 20, 2001

(51) Int. Cl.$^7$ .................. C08G 18/42; C08G 18/48; C08G 18/73; C08G 18/75; C08G 18/08
(52) U.S. Cl. ................. 528/76; 528/48; 528/80; 528/83
(58) Field of Search ............... 528/48, 76, 80, 528/83

(56) References Cited

U.S. PATENT DOCUMENTS

| | | | |
|---|---|---|---|
| 4,062,524 A | 12/1977 | Brauner et al. | 366/340 |
| 5,218,058 A | * 6/1993 | Zeitler et al. | 525/453 |
| 5,241,004 A | * 8/1993 | Kopytko | 525/123 |
| 5,541,277 A | 7/1996 | Muhlfed et al. | 528/28 |
| 5,824,738 A | 10/1998 | Humphrey et al. | 524/715 |

FOREIGN PATENT DOCUMENTS

| | | |
|---|---|---|
| CA | 2292020 | 6/2000 |
| DE | 2901774 | 7/1980 |
| DE | 197 57 569 | 6/1999 |
| JP | 6-116355 | 4/1994 |
| WO | 97/44373 | 11/1997 |

OTHER PUBLICATIONS

Database WPI, Week 9547, Derwent Publications Ltd., London, GB; AN 1995–363366, XP002176462, "Cover for Housing Air Bag Device for Automobile" & JP 07 246901 A (Asahi Kasei), Sep. 26, 1995.

Justice Liebigs, "Annalen Der Chemie", vol. 562, pp. 76–136, 1948.

Chem. Ing. Tech, 1980, Nr. 4, pp. 285–291, Pahl et al, "Statische Mischer und ihre Anwendung".

* cited by examiner

Primary Examiner—Rabon Sergent
(74) Attorney, Agent, or Firm—Joseph C. Gil; James R. Franks; Aron Preis

(57) ABSTRACT

A molding composition comprising thermoplastic polyurethane is disclosed. The polyurethane is characterized in having ultimate tensile strength (UTS) and elongation at break (EAB) values after hot storage which are, each, at least 60% of the corresponding value before hot storage, glass transition temperature equal to or lower than −50° C., UTS and EAB values after hydrolytic storage which are, each, at least 80% of the corresponding value before hydrolytic storage, and Shore A hardness of 70 to 95. The polyurethane is a product of a reaction comprising an aliphatic diisocyanate, a mixture of polyols and a chain extender and contains a UV stabilizer, an antioxidant and an optional anti-hydrolysis agent.

8 Claims, No Drawings

ALIPHATIC THERMOPLASTIC POLYURETHANES, A PROCESS FOR PRODUCING THEM AND THE USE THEREOF

This invention relates to aliphatic thermoplastic polyurethanes (TPUs) which exhibit improved properties, to a process for producing them and to the use thereof.

The current requirements which are imposed on materials for use in the interior trim of motor vehicles, particularly for surface mouldings for instrument panels (IPs), are very complex, especially if the passenger airbag is designed as an invisible, integral component of the IP. This means that the only materials which can be used are those which fulfil the complex combination of this range of requirements, such as stability to light, heat and hydrolysis, for example, and which also fulfil the requirement of allowing the passenger airbag to open, even at temperatures of −30° C. and below, without a brittle reaction. If only one of these essential conditions of the range of requirements of the automobile industry is not complied with, the material is not suitable for this application.

Aromatic thermoplastic polyurethanes (aromatic TPUs) are not stable to light due to their synthesis from aromatic diisocyanates. When colours are incorporated in mouldings, a strong yellowing effect occurs due to the effect of light, and even black mouldings exhibit changes in colour and in their degree of gloss.

DE-C 42 03 307 describes a thermoplastic polyurethane moulding composition in the form of a sinterable powder for the production of embossed sintered sheeting, wherein the powder is produced solely from linear, aliphatic components. The polyol component is composed of 60 to 80 parts by weight of an aliphatic polycarbonate diol with a molecular weight $M_n$ of 2000, and of 40 to 20 parts by weight of a polydiol based on adipic acid, hexanediol and neopentyl glycol with a molecular weight $M_n$ of 2000. 1,6-hexamethylene diisocyanate is used in an equivalent ratio from 2.8:1.0 to 4.2:1.0 with respect to the polyol mixture and 1,4-butanediol is used as a chain extender, wherein the equivalent ratio of the 1,4-butanediol with respect to the polyol mixture ranges from 1.3:1.0 to 3.3:1.0. This moulding composition fulfils all the requirements with regard to its stability to light, heat, hydrolysis and embossing, but has the disadvantage, due to its $T_G$ of $\geq -45°$ C., that it is too brittle in passenger airbag sudden inflation tests at −30° C. (some automobile companies require this level of flexibility when cold), which is why this material is unsuitable for this application (IPs comprising an integral, invisible passenger airbag).

U.S. Pat. No. 5,824,738 describes an aliphatic TPU which is stable to light and which is distinguished by only very slight yellowing even after intensive artificial weathering. The light-stable TPU which is described there consists of a critical combination of a UV stabiliser, antioxidant and pigment. These light-stable TPUs based on $H_{12}$-MDI do in fact have a very low $T_G$ of about −68° C., but do not fulfil the requirements of most automobile companies as regards stability during hot storage.

The object of the present invention was therefore to provide thermoplastic polyurethanes (TPUs) which are stable to light, heat and hydrolysis and which do not tend to exhibit brittleness at low temperatures, and to provide a process for the production thereof.

It has been possible to achieve this object by means of the thermoplastic polyurethanes according to the invention.

The present invention relates to light-stable, aliphatic, thermoplastic polyurethanes having an ultimate tensile strength and an elongation at break after hot storage (500 hours at 120° C.) which amount to at least 60% (preferably at least 70%) of the initial ultimate tensile strength and elongation at break before hot storage, and having a glass transition temperature $T_G$ (as measured by means of dynamic mechanical analysis (DMS) in tensile mode, which is described in more detail below) of less than or equal to −50° C., and having an ultimate tensile strength and an elongation at break after hydrolytic storage (at 80° C. and after 7 days) which amount to at least 80% (preferably at least 85%) of the initial ultimate tensile strength and initial elongation before hydrolytic storage, and having a hardness of 70 to 95 Shore A. (preferably 70 to 90 Shore A).

The test conditions for hydrolytic storage and hot storage are defined in more detail below.

Therefore, the only TPUs which are suitable are those which exhibit a decrease in ultimate tensile strength and elongation at break after hot storage (500 hours at 120° C.) of less than 40% (preferably less than 30%) and which a the same time exhibit a decrease in their ultimate tensile strength and elongation at break after hydrolytic storage (80° C. for 7 days) of less than 20% (preferably less than 15%).

The aliphatic thermoplastic polyurethanes according to the invention are preferably obtainable from A) aliphatic diisocyanates selected from the group consisting of hexamethylene diisocyanate (HDI), dicyclohexylmethane diisocyanate (hydrogenated MDI) or isophorone diisocyanate (IPDI) or mixtures thereof, B) a mixture of polyether polyol having a number average molecular weight of 600 to 10,000 g/mol with a polyester polyol having a number average molecular weight of 600 to 10,000 g/mol, C) a chain extender with an average molecular weight of 60 to 500 g/mol, D) UV stabilisers in an amount from 0.4 to 0.9% by weight with respect to A)+B)+C), E) antioxidants in an amount from 0.2 to 5.0% by weight with respect to A)+B)+C), F) anti-hydrolysis agents (such as carbodiimides for example) in an amount from 0 to 2.0% by weight, preferably from 0.2 to 2.0% by weight, with respect to the polyester polyol, G) optionally catalysts, and H) optionally customary adjuvant substances and additives, wherein the equivalent ratio of diisocyanate A) to polyol B) is between 1.5:1.0 and 10:1.0 and wherein the NCO characteristic number (formed from the quotient comprising the equivalent ratio of isocyanate groups divided by the sum of the hydroxyl groups from the polyol and the chain extender, multiplied by 100) ranges from 95 to 105.

When polycaprolactone diol is used as a polyester polyol, an anti-hydrolysis agent is not required. Polycaprolactone diol (polyester polyol) can be used without a polyether polyol.

The above sequence of components A to H does not imply any statement regarding the production of the TPUs according to the invention. The TPUs according to the invention can be produced by any conventional process.

The TPUs according to the invention, which are based on two different aliphatic diisocyanates "A1" and "A2", can be produced, for example, in one reaction process to form TPU "A1-2" as described below. In the known manner, however, TPU "A1" based on aliphatic diisocyanate "A1" can be produced first, and TPU "A2" based on aliphatic diisocyanate "A2" can be produced separately therefrom, wherein the remaining components B to H are identical. Thereafter, TPU "A1" and TPU "A2" are mixed in the desired ratio to form TPU "A1-A2" (e.g. in extruders or kneaders).

The TPUs according to the invention, which are based on polyol mixtures, can also be produced using polyol mixtures (polyol B1 and polyol B2) (e.g. in mixer units) to form TPU B1-2 in one reaction process, which is described in more detail below. Alternatively, and in the known manner, TPU B1 based on polyol B1 can first be produced, and TPU B2 based on polyol B2 can be produced separately therefrom, wherein the remaining components A and C to H are identical Thereafter, TPUs B 1 and B2 are mixed in the desired ratio and in the known manner (e.g. in extruders or kneaders) to form TPU B 1-2.

A mixture of 20 to 80% by weight of a polyether polyol with an average molecular weight of 1000 to 8000 g/mol and 80 to 20% by weight of a polyalkanediol adipate or of a polycaprolactone diol with an average molecular weight of 1000 to 8000 g/mol is preferably used as a polyol component.

A polycaprolactone diol with a molecular weight of 1000 to 5000 g/mol is also preferably used as a polyol component.

The polyol component most preferably consists of a mixture of 30 to 70% by weight of a polyether polyol with an average molecular weight of 1000 to 8000 g/mol and 70 to 30% by weight of a polyalkanediol adipate or of a polycaprolactone diol with an average molecular weight of 1000 to 8000 g/mol.

If the polyalkanediol adipate in the polyol mixture is sensitive to hydrolysis, known anti-hydrolysis agents (such as carbodiimides, see also the Kunststoffhandbuch, Polyurethanes, Volume 7) should be added to the polyalkanediol adipate. In the case that the proportion of polyalkanediol adipate in the polyol mixture is e.g. greater than 25% by weight and its acid number is greater than 0.03, known anti-hydrolysis agents should be added to the polyalkanediol adipate.

If the proportion of polyether polyol in the polyol mixture is greater than 40% by weight, at least 0.5% by weight of an antioxidant (with respect to the TPU from A)+B)+C)) should be added.

A mixture of what are termed hindered amine stabilisers (HALS) and hydroxyphenylbenzotriazoles in a ratio by weight of 2:1 to 1:2 is most preferably used as a UV stabiliser.

Suitable antioxidants and UV stabilisers are described by R. Gächter, H. Mütller (Eds.) in Taschenbuch der Kunststoff-Additive, 3rd Edition, Hanser Verlag, Munich 1989.

When used for applications which have lesser requirements as regards stability to light, e.g. dark-coloured moulding compositions, the aliphatic diisocyanate can be replaced in part by aromatic diisocyanates. These are described in Justus Liebigs Annalen der Chemie 562, pages 75–136. Examples include toluene 2,4-diisocyanate, mixtures of toluene 2,4-diisocyanate and toluene 2,6-diisocyanate, 4,4'-, 2,2'- and 2,4'-diphenylmethane diisocyanates, mixtures of 2,4- and 4,4'-diphenylmethane diisocyanates, urethane-modified liquid 2,6- and/or 4,4'-diphenylmethane diisocyanates, 4,4'-diisocyanatodiphenylethane(1,2) and 1,5-naphthylene diisocyanate.

The compounds which are used as component D) are those which are described by R. Gächter, H. Müller (Eds.) in: Taschenbuch der Kunststoff-Additive, 3rd Edition, Hanser Verlag, Munich 1989, "Polyurethanes" chapter.

Linear, hydroxyl-terminated polyols with an average molecular weight of 600 to 10,000 g/mol, preferably 1000 to 8000 g/mol, are used as component B). Due to their method of production, these often contain small amounts of nonlinear compounds. Therefore, they are often referred to as "substantially linear polyols". The latter polyols are also suitable as component B).

Suitable polyester diols can be produced, for example, from dicarboxylic acids comprising 2 to 12 carbon atoms, preferably 4 to 6 carbon atoms, and polyhydric alcohols. Examples of suitable dicarboxylic acids include: aliphatic dicarboxylic acids such as succinic acid, glutaric acid, adipic acid, suberic acid, azelaic acid and sebacic acid, and aromatic dicarboxylic acids such as phthalic acid, isophthalic acid and terephthalic acid. These dicarboxylic acids can be used individually or as mixtures, e.g. in the form of a mixture of succinic, glutaric and adipic acids. It can also be advantageous for the production of the polyester diols if the corresponding dicarboxylic acid derivatives, such as carboxylic acid diesters comprising with 1 to 4 carbon atoms in their alcohol radical, carboxylic anhydrides or carboxylic acid chlorides, are used instead of dicarboxylic acids. Examples of polyhydric alcohols include glycols comprising 2 to 10, preferably 2 to 6 carbon atoms, such as ethylene glycol or diethylene glycol, 1,4-butanediol, 1,5-pentanediol, 1,6-hexanediol, 1,10-decanediol, 2,2-dimethyl-1,3-propanediol, 1,3-propanediol and dipropylene glycol. Depending on the desired properties, the polyhydric alcohols can be used on their own or optionally in admixture with each other. Substances which are also suitable include esters of the carboxylic acid with the aforementioned diols, particularly those comprising 4 to 6 carbon atoms, such as 1,4-butanediol or 1,6-hexanediol, condensation products of hydroxycarboxylic acids, for example hydroxycaproic acid, and polymerisation products of lactones, for example of caprolactones which are optionally substituted. The polyester diols which are preferably used are ethanediol polyadipates, 1,4-butanediol polyadipates, ethanediol-1,4-butanediol polyadipates, 1,6-hexanediol-neopentyl glycol polyadipates, 1,6-hexanediol-1,4-butanediol polyadipates and polycaprolactones. The polyester diols have average molecular weights from 600 to 10,000, preferably from 1000 to 8000, and can be used individually or in the form of mixtures with each other.

Suitable polyether diols can be produced by the reaction of one or more alkylene oxides comprising 2 to 4 carbon atoms in their alkylene radical with an initiator molecule which contains two bound active hydrogen atoms. Examples of alkylene oxides include: ethylene oxide, 1,2-propylene oxide, epichlorohydrin, 1,2-butylene oxide and 2,3-butylene oxide. Ethylene oxide, propylene oxide and mixtures of 1,2-propylene oxide and ethylene oxide are preferably used. The alkylene oxides can be used individually, alternately in succession, or as mixtures. Examples of initiator molecules include: water, amino alcohols such as N-alkyl-diethanolamines, for example N-methyl-diethanolamines, and diols such as ethylene glycol, 1,3-propylene glycol, 1,4-butanediol and 1,6-hexanediol. Mixtures of initiator molecules can also optionally be used. Other examples of suitable polyether diols include polymerisation products of tetrahydrofuran which contain hydroxyl groups. Trifunctional polyethers can also be used in proportions from 0 to 30% by weight with respect to the bifunctional polyethers. However, the maximum amount thereof should be such that a thermoplastically processable product is formed. The substantially linear polyether diols have molecular weights from 600 to 10,000, preferably from 1000 to 8000. They can be used either individually or in the form of mixtures with each other.

Polymerisation products, which contain hydroxyl groups, of tetrahydrofuran and polyether diols based on ethylene oxide and/or propylene oxide are particularly preferred.

Aliphatic diols or (cyclo)aliphatic diamines with a molecular weight from 60 to 500 are used as the chain extender C), preferably aliphatic diols comprising 2 to 14 carbon atoms, such as ethanediol, 1,6-hexanediol, diethylene glycol or dipropylene glycol for example, and particularly 1,4-butanediol. The suitable (cyclo)aliphatic diamines include isophoronediamine, ethylenediamine, 1,2-propylenediamine, 1,3-propylenediamine, N-methylpropylene-1,3-diamine or N,N'-dimethylethylene-diamine. Mixtures of the aforementioned chain extenders can also be used. Smaller amounts of triols can also be added in addition.

1,6-hexanediol is particularly preferred as a chain extender, optionally in admixture with up to 20% by weight of a chain extender with an average molecular weight of 60 to 500 g/mol.

When used for applications which have lesser requirements as regards stability to light, e.g. dark-coloured moulding compositions, the aliphatic diols and diamines can be replaced in part by aromatic diols and diamines. Examples of suitable aromatic diols include diesters of terephthalic acid with glycols comprising 2 to 4 carbon atoms, such as terephthalic acid-bis-ethylene glycol or terephthalic acid bis-1,4-butanediol for example, hydroxyalkylene ethers of hydroquinone, such as 1,4-di(hydroxyethyl)-hydroquinone for example, and ethoxylated bisphenols. Examples of suitable aromatic diamines include: 2,4-diaminotoluene and 2,6-diaminotoluene, 3,5-diethyl-2,4-diaminotoluene and 3,5-diethyl-2,6-diaminotoluene, and primary mono-, di-, tri- or tetraalkyl-substituted 4,4'-diaminodiphenylmethanes.

In addition, customary monofunctional compounds can also be used in small amounts, e.g. as chain terminators or demoulding agents. Examples thereof include alcohols such as octanol and stearyl alcohol, and amines such as butylamine and stearylamine.

The present invention further relates to a process for the continuous production of thermoplastic polyurethanes according to the invention, which is characterised in that the polyol/the polyol mixture B) and the chain extender C) are continuously mixed, thereafter this mixture is intensively and homogeneously mixed with the diisocyanate/diisocyanate mixture A) in a static mixer with a length/diameter ratio within the range from 8:1 to 16:1 for a maximum of 5 seconds, wherein the temperature of the two mixtures before they enter the static mixer is between 60 and 150° C. and the temperatures of the two mixtures do not differ by more than 20° C., preferably by not more than 10° C., and the reaction is subsequently conducted to completion in a discharge vessel (e.g. in an extruder) and the product which is thus obtained is optionally granulated.

The reaction is preferably conducted in the presence of a catalyst.

Before components (A) and (B)+(C) are continuously introduced into the reactor, they have to be heated separately from each other, preferably in a heat exchanger, to a temperature between 60 and 150° C., preferably between 80 and 120° C. It is essential to the invention that the temperatures of components (A) and (B)+(C) differ by less than 20° C. before they are fed together into the reactor. The temperature difference between component streams (A) and (B)+(C) should preferably be <10° C., most preferably <5° C.

The mixture which is thus obtained is then reacted in any desired reactor, preferably in an extruder or a reaction tube, to form the TPU.

According to the invention, the addition polymerisation reaction is preferably conducted in an insulated static mixer which can preferably be heated. A static mixer has the advantage that it has no moving parts and that homogenous mixing throughout, which is almost free from back-mixing effects, is achieved in a very short time. Static mixers which can be used according to the invention are described in Chem.-Ing. Techn. 52, No. 4, on pages 285–291, and in "Mischen von Kunststoff und Kautschukprodukten", VDI-Verlag, Düsseldorf 1993.

Static mixers according to DE-C 23 28 795 are preferably used. These static mixers preferably have a length/diameter ratio of 8:1 to 16:1, most preferably 10:1 to 14:1. The residence time in the static mixer is <5 seconds, preferably <2.5 seconds. The static mixers are preferably made of stainless steel, most preferably of V4A steel.

The present invention further relates to a process for the continuous production of thermoplastic polyurethanes according to the invention, which is characterised in that the polyol/polyol mixture B) and the chain extender C) are continuously mixed and are thereafter reacted with hexamethylene diisocyanate. Then the reaction mixture is admixed and reacted with a different (second) aliphatic diisocyanate, the reaction is conducted to completion in a discharge vessel and the product is optionally granulated. This process variant is particularly preferred.

The process can also be conducted by reacting the mixture with a different (second) aliphatic diisocyanate, followed by admixture and reaction with hexamethylene diisocyanate, conducting the reaction to completion in a discharge vessel, and optionally granulating the product.

The thermoplastic polyurethanes according to the invention can also be produced by the prepolymer method, wherein the diisocyanate/diisocyanate mixture is first mixed with the polyol/polyol mixture and is reacted with the formation of a prepolymer, and in a second step said prepolymer is mixed with the chain extender and reacted.

A catalyst is preferably used for the continuous production of the thermoplastic polyurethanes by the extruder or belt method. Suitable catalysts include customary tertiary amines which are known in the art, such as triethylamine, dimethyl-cyclohexylamine, N-methylmorpholine, N,N'-dimethyl-piperazine, 2-(dimethyl-aminoethoxy)-ethanol, diazabicyclo-[2.2.2]-octane and the like, as well as organic compounds of metals in particular, such as esters of titanic acid, iron compounds, tin compounds e.g. tin diacetate, tin dioctoate, tin dilaurate or dialkyltin salts of aliphatic carboxylic acids such as dibutyltin diacetate, dibutyltin dilaurate or the like. The preferred catalysts are organic compounds of metals, particularly esters of titanic acid, or iron or tin compounds. Dibutyltin dilaurate is particularly preferred.

In addition to the TPU components, UV stabilisers, antioxidants, anti-hydrolysis agents and optionally catalysts, adjuvant substances and additives can also be added. Examples thereof include internal lubricants such as esters of fatty acids, metal soaps thereof, fatty acid amides and silicone compounds, anti-seizing agents, inhibitors, stabilisers against discoloration, flame retardants, colorants, pigments, inorganic and organic fillers and reinforcing agents, which are produced according to the prior art and which can also be provided with a coating of size. More detailed information on the aforementioned adjuvant substances and additives is given in the specialist literature, for example J. H. Saunders, K. C. Frisch: "High Polymers", Volume XVI, Polyurethanes, Parts 1 and 2, Interscience Publishers 1962 and 1964, respectively, R. Gächter, H. Müller (Eds.): Taschenbuch der Kunststoff-Additive, 3rd Edition, Hanser Verlag, Munich 1989, and DE-A-29 01 774.

Internal lubricants are preferably added in amounts from 0.1 to 1.0% by weight with respect to A)+B)+C).

TPUs according to the invention can also be produced by compounding different TPUs, wherein each individual TPU does not have to exhibit the properties according to the invention.

The TPUs according to the invention can be used for the production of mouldings, particularly for the production of extruded products (e.g. sheeting) and injection moulded parts. On account of their properties, they are particularly preferred in the field of automobile interiors. Moreover, the TPUs according to the invention can be used as a sinterable powder for the production of sheet-like products and hollow bodies.

The invention is explained in more detail with reference to the following examples.

EXAMPLES

Production of TPU and Injection Moulded Panels

The TPUs were continuously produced as follows:

The mixture comprising polyol/polyol mixture B), chain extender C) and dibutyltin dilaurate was heated in a vessel with stirring to about 110° C., and was intensively mixed, together with the corresponding diisocyanate, which had been heated to about 110° C. by means of a heat exchanger, in a static mixer manufactured by Sulzer (Type DN6 with 10 mixer elements and a shearing rate of 500 sec$^{-1}$) and was then fed into the inlet of a screw device (ZSK 32).

TPU 8 was a compound consisting of 70 parts by weight TPU 1 and 30 parts by weight TPU 7. TPU 9 was a compound consisting of 30 parts by weight TPU 1 and 70 parts by weight TPU 7. Each of these were compounded in a Brabender Plasti-Corder PL2000.

The granular material obtained in each case was dried and was then injection moulded to form a plurality of injection moulded panels. One part of these injection moulded panels was subjected to DMS measurements to determine $T_G$, and to tensile testing to determine the elongation at break and the ultimate tensile strength before hot storage or hydrolytic storage. The other part of the injection moulded panels was subjected to the hydrolytic storage or hot storage tests described below, which were likewise followed by tensile testing to determine the elongation at break and ultimate tensile strength.

DBTL: dibutyltin dilaurate
DE2020: a polycarbonate diol based on 1,6-hexanediol with an average molecular weight $M_n$=2000 g/mol
PE 225B: a polybutanediol adipate with an average molecular weight $M_n$=2250 g/mol
Capa® 225: a polycaprolactone diol with an $M_n$ of about 2000 g/mol (manufactured by Solvay Interox)
1,4BDO: 1,4-butanediol
Terathane 2000®: a polytetrahydrofuran diol with $M_n$=2000 g/mol (manufactured by Du Pont)
Acclaim® 2220: a polyether polyol comprising polyoxypropylene-polyoxethylene units (containing about 85% of primary hydroxyl groups and with an average molecular weight $M_n$ of about 2000 g/mol; manufactured by Lyondell)
Acclaim® 4220: a polyether polyol comprising polyoxypropylene-poly-oxethylene units (containing about 85% of primary hydroxyl groups and with an average molecular weight $M_n$ of about 4000 g/mol; manufactured by Lyondell)
HDI: hexamethylene diisocyanate
$H_{12}$-MDI: an isomeric mixture of dicyclohexylmethane diisocyanates
Abril® 10DS: bisstearylamide (manufactured by Würtz GmbH)
Irganox® 1010: tetrakis[methylene-(3,5-di-tert-butyl-4-hydroxyhydrocinnamate)]-methane (manufactured by Ciba)
Tinuvin® 328: 2-(2'-hydroxy-3,5'-di-tert-amylhexyl) benzotriazole (manufactured by Ciba)
Tinuvin® 622: a polymer of dimethyl succinate with 4-hydroxy-2,2,6,6-tetramethyl-1-piperidine ethanol (manufactured by Ciba)
1,6 HDO: 1,6-hexanediol
Stabaxol® P200: an aromatic polycarbodiimide (manufactured by Rhein-Chemie)

Composition of the TPUs

| TPU | Diisocyante | | Polyol 1 | | Polyol 2 | | 1,4BDO | 1,6HDO | DBTL |
| --- | --- | --- | --- | --- | --- | --- | --- | --- | --- |
|  | Mol |  | Mol |  | Mol |  | Mol | Mol | ppm |
| Comparison 1 | 5.15 | HDI | 1.0 | De2020 | 0.43 | PE225B | 3.77 | — | 40 |
| Comparison 2 | 8.66 | $H_{12}$-MDI | 1.0 | Acclaim 4220 | — | — | 7.66 | — | 100 |
| 1 | 4.91 | HDI | 1.0 | PE225B | 0.43 | Acclaim 2220 | — | 3.53 | 40 |
| 2 | 6.74 | HDI | 1.0 | PE225B | 1.0 | Acclaim 2220 | — | 4.95 | 40 |
| 3 | 4.23 | HDI | 1.0 | PE225B | 0.25 | Terathane 2000 | — | 3.02 | 40 |
| 4 | 4.80 | HDI | 1.0 | PE225B | 0.43 | Terathane 2000 | — | 3.42 | 40 |
| 5 | 3.32 | HDI | 1.0 | Capa225 | — | — | — | 2.36 | 40 |
| 6 | 3.22 | HDI | 1.0 | Capa225 | — | — | 2.26 | — | 40 |
| 7 | 7.51 | $H_{12}$-MDI | 1.0 | PE225B | 0.43 | Acclaim 2220 | 6.59 | — | 70 |

TPU 8 was a compound consisting of 70 parts by weight TPU 1 and 30 parts by weight TPU 7.
TPU 9 was a compound consisting of 30 parts by weight TPU 1 and 70 parts by weight TPU 7.

The TPUs Contained the Following Additives

| TPU | % by weight with respect to TPU (A) + (B) + (C) |
| --- | --- |
| 1, 7, 8, 9 | 0.3% Abril 10DS, 0.5% Irganox 1010, 0.2% Tinuvin 328, 0.6% Tinuvin 622, 1.0% Stabaxol P200 (with respect to the polyester polyol) |
| 2, 3, 4 | 0.3% Abril 10DS, 1.0% Irganox 1010, 0.2% Tinuvin 328, 0.6% Tinuvin 622, 1.0% Stabaxol P200 (with respect to the polyester polyol) |
| 5, 6 | 0.3% Abril 10DS, 1.0% Irganox 1010, 0.2% Tinuvin 328, 0.6% Tinuvin 622 |
| Comparison 1 | 0.2% Abril 10DS, 0.5% Irganox 1010, 0.2% Tinuvin 328, 0.6% Tinuvin 622 |
| Comparison 2 | 0.5% Abril 10DS, 1.0% Irganox 1010, 0.6% Tinuvin 328, 1.3% Tinuvin 622 |

Results

Hardness expressed as Shore A and $T_G$ from DMS measurements on the original injection moulded panels

|  | Hardness in Shore A | $T_G$ in ° C. |
| --- | --- | --- |
| Comparison 1 | 90 | −45 |
| Comparison 2 | 84 | −68 |
| Example 1 | 88 | −54 |
| Example 2 | 87 | −56 |
| Example 3 | 87 | −56 |
| Example 4 | 83 | −57 |
| Example 5 | 84 | −54 |
| Example 6 | 87 | −55 |

-continued

| | Hardness in Shore A | $T_G$ in °C. |
|---|---|---|
| Example 8 | 81 | −53 |
| Example 9 | 71 | −51 |

The remaining elongation at break and the remaining ultimate tensile strength in % after hot storage (500 hours at 120° C.) and hydrolytic storage (80° C. for 7 days).

| | After hot storage | | After hydrolytic storage | |
|---|---|---|---|---|
| | % Ultimate tensile strength | % Elongation at break | % Ultimate tensile strength | % Elongation at break |
| Comparison 1 | 83 | 95 | 94 | 96 |
| Comparison 2 | 32 | 13 | 100 | 100 |
| Example 1 | 83 | 95 | 94 | 96 |
| Example 2 | 72 | 83 | 93 | 92 |
| Example 3 | 91 | 80 | 88 | 87 |
| Example 4 | 88 | 78 | 90 | 90 |
| Example 5 | 92 | 87 | 91 | 93 |
| Example 6 | 91 | 89 | 92 | 91 |
| Example 8 | 80 | 82 | 93 | 92 |
| Example 9 | 85 | 81 | 91 | 93 |

The percentage change in ultimate tensile strength and elongation at break was calculated as follows: ultimate tensile strength or elongation at break (value after hydrolytic or hot storage) divided by the ultimate tensile strength or elongation at break (value before hydrolytic or hot storage) multiplied by 100 gives the % change in the ultimate tensile strength or elongation at break.

Test Conditions

Rectangular injection moulded panels (125 mm×50 mm×1 mm) were produced from the TPUs.

Dynamic Mechanical Analysis (DMS)

Rectangles (30 mm×10 mm×1 mm) were punched from the injection moulded panels. These test panels were periodically excited so that they were subjected to very small deformations under a constant prestress, which was optionally dependent on the memory module, and the force acting on the grips was measured as a function of temperature and excitation frequency.

The prestress which was additionally applied served to hold the specimen in a sufficiently stressed state at the time when it was subjected to a negative deformation amplitude.

The glass transition temperature $T_G$ was determined from the E" maximum.

DMS measurements were made using a Seiko DMS Model 210, manufactured by Seiko, at 1 Hz over the temperature range from −150° C. to 200° C. and at a heating rate of 2° C./minute.

Hot Storage

The injection moulded panels were stored suspended in a circulating air drying oven at 120° C. (±2° C. tolerance) for 500 hours.

Hydrolytic Storage

The injection moulded panels were stored suspended in deionised water at 80° C. (±2° C. tolerance) for 7 days.

Tensile Testing

The elongation at break and ultimate tensile strength were determined on S1 bars (corresponding to test specimens Type 5 according to EN ISO 527, punched from injection moulded panels) before and after storage according to DIN 53455, at a pulling rate of 200 mm/minute.

What is claimed is:

1. A molding composition comprising a light-stable, aliphatic, thermoplastic polyurethane having ultimate tensile strength (UTS) and elongation at break (EAB) values after hot storage which are, each, at least 60% of the corresponding value before hot storage, a glass transition temperature $(T_G) \leq -50°$ C., UTS and EAB values after hydrolytic storage which are, each, at least 80% of the corresponding value before hydrolytic storage, and a Shore A hardness of 70 to 95, the polyurethane being a product of a reaction consisting of A) at least one aliphatic diisocyanate selected from the group consisting of hexamethylene diisocyanate and dicyclohexylmethane diisocyanate, B) a polyol selected from the group consisting of (i) a mixture of 80 to 20 parts by weight of a polyether polyol produced by the reaction of one or more alkylene oxides consisting of two to four carbon atoms in their alkylene radicals with an initiator molecule which contains two bound active hydrogen atoms and 20 to 80 parts by weight of a polyester polyol each, independently, having a number average molecular weight of 600 to 10,000 g/mol, and (ii) a polycaprolactone diol with an average molecular weight between 1000 and 5000 g/mol, C) a chain extender having an average molecular weight of 60 to 500 g/mol, D) at least one UV stabilizer in an amount from 0.4 to 0.9% by weight with respect to A)+B)+C), E) at least one antioxidant in an amount from 0.2 to 5.0% by weight with respect to A)+B)+C), G) an optional catalyst, and F) optionally one or more additives selected from the group consisting of internal lubricant, anti-seizing agent, stabilizer against discoloration, flame retardant, colorant, pigment, filler, and reinforcing agent, wherein the equivalent ratio of diisocyanate A) to polyol B) is between 1.5:1.0 and 10:1.0 and wherein the NCO number is 95 to 105 with the proviso that where B is a mixture of polyether polyol and polyester polyol, the composition further contains an anti-hydrolysis agent (F) in an amount from 0 to 2.0% by weight with respect to the polyester polyol.

2. The thermoplastic composition of claim 1 wherein said B is a polycaprolactone diol.

3. The thermoplastic composition of claim 1 wherein said B is said mixture of 80 to 20 parts by weight of a polyether polyol and 20 to 80 parts by weight of a polyester polyol."

4. The thermoplastic composition of claim 1 wherein said chain extender (C) contains 80 to 100% 1,6-hexanediol and 0 to 20% by weight of a chain extender other than 1,6-hexanediol having an average molecular weight of 60 to 500 g/mol, said percents relative to the weight of C.

5. A continuous process for producing the thermoplastic polyurethane of claim 1 comprising mixing said A) with said B) to form a prepolymer, and reacting said prepolymer with said C.

6. An injection molded article comprising the composition of claim 1.

7. An extruded article comprising the composition of claim 1.

8. The thermoplastic composition of claim 1 in the form of a sinterable powder.

* * * * *